United States Patent
Nakamura et al.

(10) Patent No.: US 6,174,986 B1
(45) Date of Patent: *Jan. 16, 2001

(54) POLYMERIZATION OF VINYL CHLORIDE

(75) Inventors: Ichisaburo Nakamura; Akihiko Takahashi, both of Osaka; Masaaki Ozawa, Toyama, all of (JP)

(73) Assignee: Mitsui Chemicals, Inc. (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/993,245

(22) Filed: Dec. 18, 1997

(30) Foreign Application Priority Data

Dec. 20, 1996 (JP) .................................................. 8-341901

(51) Int. Cl.[7] ...................................................... C08G 8/04
(52) U.S. Cl. ........................ 528/150; 528/129; 528/143; 528/158; 528/242; 528/248; 526/62; 526/344; 526/344.1; 526/344.2; 525/398; 525/404; 525/412
(58) Field of Search ..................................... 528/129, 143, 528/150, 158, 242, 248; 525/398, 404, 412; 526/62, 344, 344.1, 344.2

(56) References Cited

U.S. PATENT DOCUMENTS

| 4,355,141 | | 10/1982 | Okada et al. ........................ 526/62 |
| 5,147,984 | * | 9/1992 | Masuko et al. ........................ 526/62 |
| 5,674,953 | * | 10/1997 | Masuko et al. ........................ 526/62 |
| 5,674,954 | * | 10/1997 | Masuko et al. ........................ 526/62 |
| 5,728,780 | * | 3/1998 | Masuko et al. ........................ 526/62 |
| 5,780,104 | * | 7/1998 | Takahashi et al. .................... 526/62 |
| 5,789,499 | | 8/1998 | Masuko et al. ........................ 526/62 |

FOREIGN PATENT DOCUMENTS

| WO89/00993 | 2/1989 | (WO) . |
| WO91/06576 | 5/1991 | (WO) . |

* cited by examiner

Primary Examiner—Duc Truong
(74) Attorney, Agent, or Firm—Burns, Doane, Swecker & Mathis, L.L.P.

(57) ABSTRACT

A process for polymerizing a vinyl chloride monomer wherein the vinyl chloride monomer is subjected to homopolymerization or (co)polymerization with a monomer copolymerizable with the vinyl chloride monomer in an aqueous solvent, comprising applying in advance a coating liquid containing a cocondensation product obtained by reacting either a phenothiazine derivative and an aldehyde or a phenothiazine derivative, a naphthol derivative and an aldehyde to give an initial condensation product and then reacting the initial product with a polyphenol, to an inner wall of a polymerization tank and parts of an apparatus in contact with the monomers during the polymerization process. The process makes it possible to apply the cocondensation product as an aqueous solution to, e.g., an inner wall of a polymerization tank; to quite effectively prevent polymer adhesion in, e.g., a polymerization tank, without affecting a polymerization rate or physical properties of the product; and thus to eliminate the need for removing adhered polymer after every polymerization process and to realize closed polymerization in which a manhole should not be opened for every polymerization process.

10 Claims, No Drawings

POLYMERIZATION OF VINYL CHLORIDE

BACKGROUND OF THE INVENTION

1) Field of the invention

This invention relates to a process for improved homopolymerization or copolymerization of vinyl chloride; in particular, to a process for preventing adhesion of polymer to an inner wall of a polymerization apparatus such as a polymerization tank and to a polymer adhesion inhibitor therefor.

2) Prior Art

When vinyl chloride is subjected to homopolymerization or copolymerization with a monomer copolymerizable with vinyl chloride, or graft polymerization (hereinafter, collectively referred to as "polymerization"), polymer may adhere to parts of an apparatus such as an inner wall of a polymerization tank, a reflux condenser, a stirring blade, a baffle and various types of pipe connections, in contact with monomer (s) during a polymerization process, causing problems such as reduction of coolability of the polymerization tank and degradation in quality of the homopolymer or copolymer of vinyl chloride (hereinafter, referred to as "the product") due to contamination with peeled polymer which has been adhered to some surface.

It is therefore usual that after every polymerization process, the inside of the polymerization tank is cleaned prior to a next polymerization process, which requires an enormous amount of labor and time, leading to reduction in productivity rate of the polymerization tank or increase in the cost for the product.

To solve the problem, there have been proposed processes for preventing a polymer adhesion to an inner wall of a polymerization tank and/or other parts by applying some agent; for example, JP-B 61-843 (U.S. Pat. No. 4,355,141) has disclosed a process comprising application of a cocondensation product of resol with a nitrogen-containing compound such as nitrophenols, nitrobenzoic acids, aminophenols and aminobenzoic acids, and JP-A(KOHYO) 2-500845 (PCT-US-88-02462, WO-89-00993) and JP-A (KOHYO) 5-501892 (PCT-US-90-05829, WO-91-06576) have proposed processes comprising application of a condensation product of phenothiazine with an aldehyde.

However, the process according to JP-B 61-843 does not sufficiently prevent scale adhesion, and a more effective method is desired. For the processes described in JP-A 2-500845 and JP-A 5-501892, since the adhesion inhibitor used can be dissolved only in an organic solvent, a particular type of organic solvent should be used as a solvent for a coating liquid, making the apparatus and/or the operation more complex in the light of safety in handling and due to need for recovery of the solvent from the polymerization system. Furthermore, there are practical problems; for example, inadequate recovery of the solvent adversely affects the quality of the product.

3) Object of the Invention

Thus we have investigated for making it possible to quite effectively prevent polymer adhesion in, e.g., a polymerization tank, in polymerization of a vinyl chloride monomer, without affecting a polymerization rate or physical properties of the product; to apply an adhesion inhibitor as a coating liquid containing no or a very small amount of organic solvents; to eliminate the need for removing adhered polymer after every polymerization process; and to realize closed polymerization in which a manhole should not be opened for every polymerization process.

SUMMARY OF THE INVENTION

We have intensively investigated to solve the above problems and have found that in polymerization of a vinyl chloride monomer, polymer adhesion to a polymerization apparatus may be significantly reduced and a small amount of polymer adhered may be readily removed, e.g., with water, by applying a coating liquid comprising a particular wall-adhesion inhibitor prior to polymerization, to parts of a polymerization apparatus and polymerization ancillaries in contact with the monomer during the polymerization process, such as an inner wall of a polymerization tank. Thus, this application discloses the following invention and embodiments;

(a) A process for (co)polymerizing a vinyl chloride monomer wherein the vinyl chloride monomer is subjected to homopolymerization or copolymerization with a monomer copolymerizable with the vinyl chloride monomer in an aqueous solvent or bulk (co)polymerization of vinyl chloride monomer or the monomers, comprising applying in advance a coating liquid containing a cocondensation product obtained by reacting either a phenothiazine derivative and an aldehyde or a phenothiazine derivative, a naphthol derivative and an aldehyde to give an initial condensation product and then reacting the initial product with a polyphenol, to an inner wall of a polymerization tank and parts of an apparatus in contact with the monomers during the polymerization process;

DETAILED DESCRIPTION OF THE INVENTION (b) A process according to (a), wherein the above cocondensation product is prepared by reacting either a phenothiazine derivative and an aldehyde or a phenothiazine derivative, a naphthol derivative and an aldehyde in the presence of an acidic catalyst to give an initial condensation product and then reacting the initial product with a polyphenol by portionwise or continuously adding the polyphenol;

(c) A process according to (a) or (b), wherein the above coating liquid is an aqueous solution of an alkali metal hydroxide or alkaline earth metal hydroxide containing the above cocondensation product;

(d) A cocondensation product with a weight-average molecular weight in the range of 500 to 5,000 prepared by reacting either a phenothiazine derivative and an aldehyde or a phenothiazine derivative, a naphthol derivative and an aldehyde to give an initial condensation product and then reacting the initial product with a polyphenol;

(e) A cocondensation product according to (d) prepared by reacting either a phenothiazine derivative and an aldehyde or a phenothiazine derivative, a naphthol derivative and an aldehyde in the presence of an acidic catalyst to give an initial condensation product and then reacting the initial product with a polyphenol by portionwise or continuously adding the polyphenol;

(f) A cocondensation product according to (d), wherein the polyphenol is pyrogallol;

(g) A wall-adhesion inhibitor for a (co)polymerization of vinyl chloride, prepared by reacting either a phenothiazine derivative and an aldehyde or a phenothiazine derivative, a naphthol derivative and an aldehyde in the presence of an acidic catalyst to give an initial condensation product and then reacting the initial product with a polyphenol by portionwise or continuously adding the polyphenol;

(h) A wall-adhesion inhibitor for a polymerization of vinyl chloride according to (g), wherein the polyphenol is pyrogallol;

(i) A process according to (c), wherein the concentration of the reaction product in the aqueous alkali metal or alkaline earth metal hydroxide solution is 0.1 to 10.0 wt %, and the concentration of the alkali metal or alkaline earth metal hydroxide is 0.05 to 5.0 wt %;

(j) A process for preventing scale adhesion, during polymerization wherein a vinyl chloride monomer is homopolymerized or copolymerized with a monomer copolymerizable with the vinyl chloride monomer, to an inner wall of a polymerization apparatus in contact with the monomers, by applying in advance a coating liquid to the inner wall, wherein the coating liquid comprises a cocondensation product by reacting either a phenothiazine derivative and an aldehyde or a phenothiazine derivative, a naphthol derivative and an aldehyde to give an initial condensation product and then reacting the initial product with a polyphenol.

A cocondensation product used in this invention may be prepared by reacting either a phenothiazine derivative and an aldehyde or a phenothiazine derivative, a naphthol derivative and an aldehyde to give an initial condensation product and then reacting the initial product with a polyphenol.

The phenothiazine derivative is generally phenothiazine, but its derivative such as the one shown in the following formula may be also used.

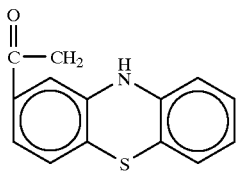

The naphthol derivative may be α- or β-naphthol or its alkylated derivative, preferably α- or β-naphthol.

The aldehyde may be an organic compound having a CHO group such as formaldehyde, acetaldehyde and benzaldehyde, which can be used solely or in combination.

Polyphenols which may be used include resorcinol, hydroquinone, pyrogallol and bisphenol-A, preferably pyrogallol.

In the process of this invention, a phenothiazine derivative and an aldehyde or a phenothiazine derivative, a naphthol derivative and an aldehyde are first reacted to give an initial condensation product, using an acidic catalyst.

Since the final product is prepared in the form of aqueous solution in this invention, the initial condensation product should have a methylol group capable of reacting with the polyphenol, wherein the aldehyde should be in excess relative to the phenothiazine derivative, generally more than 1.0 mol and up to 3.0 mol per 1.0 mol of the phenothiazine derivative, preferably 1.2 to 2.0 mol.

When the naphthol derivative is used, it is generally used in amount of 5 to 50 mol % to the phenothiazine derivative, preferably 10 to 30 mol %. The use of the naphthol derivative is preferable since it may prevent a polymer adhesion to a wall of a reaction vessel used in the reaction for the initial condensation product.

Acidic catalysts which may be used preferably include sulfuric acid, hydrochloric acid and p-toluenesulfonic acid, more preferably sulfuric acid. The acidic catalyst may be preferably used in the amount of 0.001 to 0.1 mol per 1.0 mol of the phenothiazine derivative, more preferably 0.002 to 0.05 mol.

The reaction for the initial condensation product is generally, but not limited to, conducted at 60 to 90° C. for about 1 to about 6 hours, wherein a solvent may be preferably used, for example, dioxane, dimethylformamide and cyclohexanone.

The initial condensation product is then reacted with a polyphenol. The condensation product may be generally, but not limited to, reacted at 60 to 90° C. for about 1 to about 6 hours. The polyphenol may be preferably used in the amount of 0.1 to 1.0 mol per 1.0 mol of the phenothiazine, more preferably 0.2 to 0.8 mol.

If the above amount of the polyphenol is added in one portion in the reaction of the polyphenol with the initial condensation product prepared from the phenothiazine derivative and the aldehyde or from the phenothiazine derivative, the naphthol derivative and the aldehyde, a condensation product may be precipitated in a reaction vessel for the condensation, resulting in reduction of the yield. Thus, the polyphenol is preferably added portionwise or continuously. The addition rate may be readily determined by appropriately adjusting it in a manner that precipitation of the condensation product can be avoided in the condensation vessel; it is generally added over about 30 min to about 300 min, preferably over 60 min to 240 min.

In preparation of the polymer adhesion inhibitor used in the process of this invention, a organic solvent is usually used. The solvent may be removed by, e.g., distillation after the reaction. The polymer adhesion inhibitor of this invention is used in a large amount of aqueous alkaline solution containing a lower level, up to 5%, of organic solvent, which is preferable in the light of safety and operability.

The molecular weight of the final product is pivotal. Experimental results have indicated that a good polymer adhesion inhibiting effect can be obtained with the inhibitor having 500 to 5000, preferably 1000 to 3000 of weight-average molecular weight (hereinafter, referred to as Mw) determined by GPC (Gel Permeation Chromatography). The Mw can be controlled by adjusting the conditions such as reaction time and reaction temperature.

In this invention, an aqueous alkali metal hydroxide solution or alkaline earth metal hydroxide solution containing the above reaction product is applied to, for example, an inner wall of a polymeraization tank.

For the aqueous alkali metal or alkaline earth metal hydroxide solution, alkali metal hydroxides which may be used include lithium, sodium and potassium hydroxides, preferably sodium and potassium hydroxides, and the alkaline earth metal hydroxide is preferably calcium hydroxide.

Herein, the coating liquid may be prepared as an aqueous alkaline solution containing generally 0.05 to 5.0 wt %, preferably 0.1 to 3.0 wt % of an alkali metal or alkaline earth metal hydroxide, and generally 0.1 to 10 wt %, preferably 0.2 to 6.0 wt % of the reaction product. Equal to or more than 0.1 wt % of the reaction product may give a suitable amount of a coating liquid to realize good operability and give an excellent polymer adhesion inhibiting effect. A liquid containing equal to or less than 10.0 wt % of the reaction product may be readily and evenly applied to the wall surface and the application amount may be appropriate and thus economical. Furthermore, since it may be applied at an appropriate concentration, it can avoid drawbacks such as staining of the product due to elution of the components of the coating film into the reaction system.

When the aqueous alkali metal or alkaline earth metal hydroxide solution containing the reaction product is used, a water-soluble additive may be added for improving the adhesion efficiency of the scale inhibitor on, for example, the wall surface of the polymerization tank. The additive may be selected from water-soluble compounds including humic acid and its derivatives described in JP-A 54-85291; cellulose and its derivatives described in JP-A 54-162782; alginic acid described in JP-A 55-13708; hemicellulose described in JP-A 55-231235; starch and its derivatives described in JP-A 54-38844; and polyvinyl alcohol and polyvinylpyrrolidone.

The coating liquid in this invention may be applied by a common method such as, but not limited to, brushing, spraying and rising. After application, the wall may be washed with water, if necessary. The application amount as the weight of the reaction product may be generally 0.005 to 10 g/m² preferably 0.01 to 5 g/cm², more preferably 0.01 to 3 g/m². When it is equal to or more than 0.005 g/m², a coating film generated may have a proper thickness and an excellent polymer adhesion inhibiting effect can be obtained. When it is equal to or less than 10 g/m², the coating liquid is economical and is preferable because of its low possibility of an adverse effect on the product. The coating liquid may be applied before initiation of polymerization of every batch, or once for several batches wherein the tank may be simply washed with water after each batch and polymerization can be repeated.

This invention can be applied to homopolymerization of vinyl chloride as well as copolymerization of vinyl chloride with one or more other radical-copolymerizable monomer or graft copolymerization of vinyl chloride with a polymer which may be subject to graft copolymerization with vinyl chloride.

Other polymeric monomers which may be used in the polymerization include vinyl esters such as vinyl acetate, vinyl propionate, vinyl caproate, vinyl laurate and vinyl stearate; olefins such as ethylene, propylene and isobutylene; alkyl or aryl vinyl ethers such as isobutyl vinyl ether, octyl vinyl ether, dodecyl vinyl ether and phenyl vinyl ether; halogenated olefins such as vinylidene chloride, vinyl fluoride, propylene chloride and vinyl bromide; acrylates or methacrylates such as ethyl acrylate, n-butyl acrylate, 2-ethylhexyl acrylate, 2-ethylhexyl methacrylate and stearyl methacrylate; acrylic acid derivatives such as acrylic acid, methacrylic acid and crotonic acid; acrylonitrile; and dicarboxylic acid monomers such as maleic anhydride, itaconic acid anhydride, maleic acid, maleates, fumaric acid and fumarates. These copolymerizable monomers may be used as long as they do not exceed 50 wt % to vinyl chloride.

Polymers which may be subjected to graft polymerization with vinyl chloride include ethylene-vinyl acetate copolymer (EVA), ethylene-ethyl acrylate copolymer, chlorinated polyethylene, polyurethane, polybutadiene, polybutadiene-styrene-methyl methacrylate (MBS), polybutadiene-acrylonitrile-(α-methyl) styrene (ABS), polybutyl acrylate, isobutylene-isoprene rubber, polystyrene, styrene-butadiene copolymer and crosslinked acrylic rubber. These graft-copolymerizable monomers may be used as long as they do not exceed 50 wt % to vinyl chloride.

This invention may be effectively applied to aqueous suspension polymerization and aqueous emulsion polymerization of the above monomers as well as bulk polymerization only with the above monomers and without any polymerization medium, under the respective usual polymerization conditions. This invention is also effective under the closed polymerization conditions as described in JP-A 7-233207.

The process of this inventin makes it possible to quite effectively prevent polymer adhesion in, e.g., a polymerization tank, in polymerization of a vinyl chloride monomer, without affecting a polymerization rate or physical properties of the product. Therefore, there is no need for removal of adhered polymer after every polymerization process, and thus closed polymerization which has recently become popular can be realized, in which a manhole is not opened in every polymerization process.

This invention will be more specifically described with the following examples. It should be, however, understood that the examples are intended only to illustrate, but not to limit, this invention. Unless otherwise mentioned, in these examples, % means wt %.

PREPARATION EXAMPLE 1

Preparation of a Cocondensation Product of Phenothiazine and Pyrogallol

In a 500 mL SUS reaction vessel were placed 20.0 g of phenothiazine (0.10 mol), 240 mL of dioxane, 13.8 g of 37 wt % formalin (0.17 mol) and 0.41 g of 5.0 wt % sulfuric acid (0.0021 mol), and the mixture was heated to 80° C. The mixture was reacted for 1 hour while maintaining this temperature, to give an initial condensation product, whose Mw was 365 as determined by GPC technique.

Then the mixture was cooled to 65° C., 7.6 g of pyrogallol (0.06 mol) was added dropwise at this temperature over 3 hours and 40 min, and the mixture was reacted for another 1 hour at this temperature to give a cocondensation product. Then, after cooling, the reaction mixture was diluted to 2.0 wt % of the concentration of the cocondensation product with a 2.0 wt % aqueous solution of sodium hydroxide. The Mw of the cocondensation product obtained was 1540 as determined by GPC.

PREPARATION EXAMPLE 2

Preparation of a Cocondensation Product of Phenothiazine and Pyrogallol

In a 500 mL SUS reaction vessel were placed 20.0 g of phenothiazine (0.10 mol), 240 mL of dioxane, 12.2 g of 37 wt % formalin (0.15 mol) and 0.41 g of 5.0 wt % sulfuric acid (0.0021 mol), and the mixture was heated to 80° C. The mixture was reacted for 1 hour while maintaining this temperature, to give an initial condensation product, whose Mw was 361 as determined by GPC technique.

Then the mixture was cooled to 65° C., 3.8 g of pyrogallol (0.03 mol) was added dropwise at this temperature over 3 hours and 40 min, and the mixture was reacted for another 1 hour at this temperature to give a cocondensation product. Then, after cooling, the reaction mixture was diluted to 2.0 wt % as the concentration of the cocondensation product with a 2.0 wt % aqueous solution of sodium hydroxide. The Mw of the cocondensation product obtained was 1480 as determined by GPC.

PREPARATION EXAMPLE 3

Preparation of a Cocondensation Product of Phenothiazine, β-naphthol and Pyrogallol In a 2 liter SUS autoclave were placed 46.1 g of phenothiazine (0.232 mol), 8.40 g of β-naphthol (0.0583 mol) 620 g of dioxane, 39.88 g of 37 wt % formalin (0.492 mol) and 1.28 g of 5.0 wt % sulfuric acid (0.00065 mol), and then the mixture was heated to 80° C. to be reacted for 1 hour.

Then the mixture was cooled to 65° C., 21.85 g of pyrogallol (0.173 mol) was added over 3 hours and 40 min, and the mixture was reacted for 1 hour and 20 min at this temperature.

Then, after cooling, the reaction mixture was diluted to 2.0 wt % of the concentration of the reaction product with a 2.0 wt % aqueous solution of sodium hydroxide. The Mw of the cocondensation product obtained was 1490.

PREPARATION EXAMPLE 4

In a 300 mL three-necked flask with a reflux condenser were placed 37.5 g of phenol (0.39 mol), 48.5 g of 37 wt % formalin (0.599 mol) and 0.638 g of sodium hydroxide (0.16 mol), and the mixture was heated to 85° C. and reacted for 2 hours and 40 min while maintaining this temperature, to give an initial condensation product, whose Mw was 410 as determined by GPC technique.

After cooling to 40° C., to the mixture were dissolved 1.50 g of o-sec-butylphenol (0.010 mol), 7.67 g of 90 wt % orthanilic acid (0.040 mol) at this temperature, and the reaction mixture was heated to 75° C. and reacted while maintaining this temperature. Once its viscosity reached 100 centipoise as determined with a B type of viscosimeter, the reaction mixture was cooled, to which were then added a 26 wt % aqueous solution of sodium hydroxide and deionized water to give a solution whose concentrations of the reaction product and sodium hydroxide were 10.0 wt % and 2.0 wt %, respectively. The Mw of the reaction product obtained was 1430 as determined by GPC.

Formulation Example 1 of a Coating Liquid

The solution of sodium hydroxide containing the reaction product prepared according to Preparation Example 1 was diluted to 0.3 wt % as the concentration of the cocondensation product with deionized water.

Formulation Example 2 of a Coating Liquid

The solution of sodium hydroxide containing the reaction product prepared according to Preparation Example 2 was diluted to 0.3 wt % as the concentration of the cocondensation product with deionized water.

Formulation Example 3 of a Coating Liquid

The solution of sodium hydroxide containing the reaction product prepared according to Preparation Example 3 was diluted to 0.3 wt % as the concentration of the cocondensation product with deionized water.

Formulation Example 4 of a Coating Liquid

The solution of sodium hydroxide containing the reaction product prepared according to Preparation Example 4 was diluted to 1.0 wt % as the concentration of the condensation product with deionized water.

EXAMPLE 1

With a vacuum pump, the air was evacuated from a 840 liter polymerization tank with a reflux condenser; then to the tank was placed vinyl chloride monomer to 0.1 kg/cm$^2$G of the inner pressure of the tank; and then one liter of the coating liquid according to Formulation Example 1 of a coating liquid was sprayed or the inner wall of the polymerization tank, which was then fully washed with water.

In the tank were placed 260 liters of deionized water, and then 0.037 parts by weight (parts by weight to 100 parts by weight of vinyl chloride monomer, which shall also apply hereinafter) of polyvinyl alcohol with 80 mol % of saponification value and 2000 of polymerization degree and 0.074 parts by weight of polyvinyl alcohol with 70 mol % of saponification value and 700 of polymerization degree, and finally 229 kg of vinyl chloride monomer. Into the tank were pumped 167 g of a 60 wt % aqueous emulsion of dioctylperoxy dicarbonate and 64 g of a 50 wt % aqueous emulsion of α-cumylperoxy neodecanate.

The mixture was heated to 57.8° C. to initiate polymerization. After 4 hours and 30 min, into the tank was pumped an aqueous suspension of phenolic antioxidant, and the resulting slurry was removed from the polymerization tank. The remaining monomers were removed from the slurry via a monomer removal process. After dewatering the resulting polymer was dried to give a PVC resin. The inside of polymerization tank after removing the PVC slurry was washed with water without opening its manhole, the materials for the next batch were placed in the tank without applying coating liquid, and the second polymerization was initiated. The same polymerization process was repeated to 10 consecutive batches in total. After completing 10 batches, the product was collected for evaluation of its physical properties, and the adhered polymer on the inner surface of the polymerization tank was also collected for determination of its weight. The results are shown in Table 1.

Test and evaluation procedures for the polymers described in this specification are as follows.

1) Average polymerization degree: According to JIS K-6721.

2) Apparent specific gravity: According to JIS K-6721.

3) Fish eye: Hundred (100) parts by weight of a polymer was blended with 50 parts by weight of DOP (dioctyl phthalate) and 2 parts by weight of tribasic lead sulfate, and the mixture was kneaded at 150° C. for 5 min and formed into a sheet 0.3 mm in thickness, whose number of spots was visually counted within the area of 10 cm×10 cm.

4) Porosity: Determined by a mercury injection method.

EXAMPLE 2

Polymerization was conducted as described in Example 1, except that the coating liquid from Formulation Example 1 was replaced with that from Formulation Example 2. The results are shown in Table 1.

EXAMPLE 3

Polymerization was conducted as described in Example 1, except that the coating liquid from Formulation Example 1 was replaced with that from Formulation Example 3. The results are shown in Table 1.

Comparative Example 1

Polymerization was conducted as described in Example 1, except that the coating liquid from Formulation Example 1 was replaced with that from Formulation Example 4. The results are shown in Table 1.

monomer or the monomers, comprising applying in advance a coating liquid containing a cocondensation product obtained by reacting either a phenothiazine derivative and an aldehyde or a phenothiazine derivative, a naphthol derivative and an aldehyde to give an initial condensation product and then reacting the initial product with a polyphenol, to an inner wall of a polymerization tank and parts of an apparatus in contact with the monomers during the polymerization process.

2. A process as claimed in claim 1, wherein the cocondensation product is prepared by reacting either a phenothiazine derivative and an aldehyde or a phenothiazine derivative, a naphthol derivative and an aldehyde in the presence of an acidic catalyst to give an initial condensation product and then reacting the initial product with a polyphenol by portionwise or continuously adding the polyphenol.

3. A process as claimed in claim 1, wherein the coating liquid is an aqueous solution of an alkali metal hydroxide or alkaline earth metal hydroxide containing the cocondensation product.

4. A cocondensation product with a weight average molecular weight in the range of 500 to 5,000 prepared by reacting either a phenothiazine derivative and an aldehyde or a phenothiazine derivative, a naphthol derivative and an aldehyde to give an initial condensation product and then reacting the initial product with a polyphenol.

5. A cocondensation product as claimed in claim 4 prepared by reacting either a phenothiazine derivative and an aldehyde or a phenothiazine derivative, a naphthol derivative and an aldehyde in the presence of an acidic catalyst to give an initial condensation product and then reacting the initial product with a polyphenol by portionwise or continuously adding the polyphenol.

TABLE 1

|  | Example 1 | Example 2 | Example 3 | Comp. Ex. 1 |
|---|---|---|---|---|
| No. of polymerization* | 10 | 10 | 10 | 10 |
| Coating liquid |  |  |  |  |
| Name | Modified condensate of phenothiazine | Modified condensate of phenothiazine | Modified condensate of phenothiazine and β-naphthol | Resol |
| Solvent | NaOH aq. | NaOH aq. | NaOH aq. | NaOH aq. |
| Concentration of the coating (wt %) | 0.3 | 0.3 | 0.3 | 1.0 |
| Application quantity (g/m²) | 0.6 | 0.6 | 0.6 | 2.0 |
| Polymerzation time (hr) | 4.5 | 4.4 | 4.5 | 4.6 |
| Quantity of adhered polymer (g/m²) | 1.0 | 2.0 | 0.3 | 18.0 |
| Physical properties of a resin |  |  |  |  |
| Average polymerization degree | 1030 | 1040 | 1040 | 1050 |
| Apparent specitic gravity (g/mL) | 0.465 | 0.471 | 0.470 | 0.451 |
| Particle size distribution (wt %) equal to or larger than 60 mesh | 0 | 0 | 0 | 0 |
| 60 to 100 mesh | 21 | 22 | 21 | 35 |
| 100 to 200 mesh | 76 | 74 | 75 | 61 |
| equal to or smaller than 200 mesh | 3 | 4 | 4 | 4 |
| Fisheye (number) | 4 | 5 | 4 | 18 |
| Porosity (vol %) | 27 | 26 | 26 | 24 |

*The coating liquid was applied prior to only the first polymerization.

What we claimed is:

1. A process for (co)polymerizing a vinyl chloride monomer wherein the vinyl chloride monomer is subjected to homopolymerization or copolymerization with a monomer copolymerizable with the vinyl chloride monomer in an aqueous solvent or bulk (co)polymerization of vinyl chloride 6. A cocondensation product as claimed in claim 4, wherein the polyphenol is pyrogallol.

7. A wall-adhesion inhibitor for a (co)polymerization of vinyl chloride, prepared by reacting either a phenothiazine derivative and an aldehyde or a phenothiazine derivative, a naphthol derivative and an aldehyde in the presence of an acidic catalyst to give an initial condensation product and then reacting the initial product with a polyphenol by portionwise or continuously adding the polyphenol.

8. A wall-adhesion inhibitor for a (co)polymerization of vinyl chloride as claimed in claim 7, wherein the polyphenol is pyrogallol.

9. A process as claimed in claim 3, wherein the concentration of the reaction product in the aqueous alkali metal hydroxide or alkaline earth metal hydroxide solution is 0.1 to 10.0 wt %, and the concentration of the alkali metal or alkaline earth metal hydroxide is 0.05 to 5.0 wt %.

10. A process for preventing scale adhesion, during (co) polymerization wherein a vinyl chloride monomer is homopolymerized or copolymerized with a monomer copolymerizable with the vinyl chloride monomer, to an inner wall of a polymerization apparatus in contact with the monomers, by applying in advance a coating liquid to the inner wall, wherein the coating liquid comprises a cocondensation product by reacting either a phenothiazine derivative and an aldehyde or a phenothiazine derivative, a naphthol derivative and an aldehyde to give an initial condensation product and then reacting the initial product with a polyphenol.

* * * * *